(12) United States Patent
Ellison-Marion et al.

(10) Patent No.: US 9,037,283 B2
(45) Date of Patent: May 19, 2015

(54) APPARATUS SAFEGUARD

(75) Inventors: Nadine M. Ellison-Marion, Wappingers Falls, NY (US); Mark A. Nelson, Poughkeepsie, NY (US); Kevin H. Peters, Germantown, NY (US); Louis R. Ruggiero, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 13/343,777

(22) Filed: Jan. 5, 2012

(65) Prior Publication Data

US 2013/0178955 A1    Jul. 11, 2013

(51) Int. Cl.
*G06F 19/00*    (2011.01)
*F16P 7/00*    (2006.01)

(52) U.S. Cl.
CPC ........................................ *F16P 7/00* (2013.01)

(58) Field of Classification Search
CPC ............... G05B 9/00; G05B 9/03; F16P 3/00; F16P 7/00
USPC ................................................... 700/79, 177
See application file for complete search history.

(56) References Cited

U.S. PATENT DOCUMENTS

| | | |
|---|---|---|
| 3,953,770 A | 4/1976 | Hayashi |
| 3,958,164 A | 5/1976 | Hess |
| 4,466,040 A | 8/1984 | Barthel et al. |
| 4,853,821 A | 8/1989 | Lewis |
| 5,023,597 A | 6/1991 | Salisbury |
| 5,164,707 A | 11/1992 | Rasmussen et al. |
| 5,193,665 A | 3/1993 | Jankow |
| 5,198,627 A | 3/1993 | Diaz et al. |
| 5,315,289 A | 5/1994 | Fuller et al. |
| 5,563,581 A | 10/1996 | Kats |
| 5,993,039 A | 11/1999 | Crill |
| 6,208,042 B1 | 3/2001 | Solis |
| 6,461,176 B1 | 10/2002 | Haas |
| 6,532,550 B1 * | 3/2003 | Crew et al. ...................... 714/11 |
| 6,773,277 B2 | 8/2004 | Issa |
| 6,853,303 B2 | 2/2005 | Chen et al. |
| 6,856,852 B1 | 2/2005 | Bruinsma et al. |
| 6,903,624 B2 | 6/2005 | Stenberg et al. |
| 7,075,195 B2 | 7/2006 | Feil |
| 7,619,504 B2 | 11/2009 | Cohen |

(Continued)

FOREIGN PATENT DOCUMENTS

| | | |
|---|---|---|
| CN | 21176875 Y | 1/2009 |
| WO | WO2004066466 | 8/2004 |

OTHER PUBLICATIONS

Office Action (Mail Date Jan. 16, 2013) for U.S. Appl. No. 12/817,256, filed Jun. 17, 2010.

(Continued)

*Primary Examiner* — Kenneth Lo
*Assistant Examiner* — Chad Rapp
(74) *Attorney, Agent, or Firm* — Schmeiser, Olsen & Watts; Matthew Chung

(57) ABSTRACT

A safeguard method and system. The method includes receiving and analyzing apparatus data associated with an electro/mechanical apparatus. A type, mode, and state of the electro/mechanical apparatus are determined and a list of associated safeguard devices is generated and presented to a user. A selection for a safeguard device is received and it is determined if the safeguard device is currently present. In response, a specified action is executed.

20 Claims, 4 Drawing Sheets

(56) References Cited

U.S. PATENT DOCUMENTS

| | | |
|---|---|---|
| 7,716,239 B2 * | 5/2010 | Murez et al. ............... 707/779 |
| 7,890,235 B2 | 2/2011 | Self et al. |
| 8,208,681 B2 | 6/2012 | Heller et al. |
| 2002/0117902 A1 | 8/2002 | Evers et al. |
| 2003/0036822 A1 | 2/2003 | Davis et al. |
| 2004/0160129 A1 | 8/2004 | Dahlberg |
| 2005/0159184 A1 | 7/2005 | Kerner et al. |
| 2006/0027446 A1 | 2/2006 | Castaldo |
| 2006/0044140 A1 | 3/2006 | Berg |
| 2006/0268482 A1 | 11/2006 | Lin et al. |
| 2009/0040014 A1 | 2/2009 | Knopf et al. |
| 2009/0161918 A1 | 6/2009 | Heller et al. |
| 2009/0224868 A1 | 9/2009 | Liu et al. |
| 2009/0273436 A1 | 11/2009 | Gluck et al. |
| 2010/0045464 A1 | 2/2010 | Knopf et al. |
| 2010/0057944 A1 | 3/2010 | Eberhard |
| 2011/0309936 A1 | 12/2011 | Nelson et al. |
| 2012/0071017 A1 | 3/2012 | Gaul et al. |

OTHER PUBLICATIONS

Amendment filed Mar. 18, 2013 in response to Office Action (Mail Date Jan. 16, 2013) for U.S. Appl. No. 12/817,256, filed Jun. 17, 2010.

Notice of Allowance (Mail Date Apr. 15, 2013) for U.S. Appl. No. 12/817,256, filed Jun. 17, 2010.

* cited by examiner

APPARATUS SAFEGUARD

FIELD

The present invention relates to a method and associated system for performing an action with respect to an apparatus based on a safeguard device.

BACKGROUND

Determining a safe method for operating an apparatus typically comprises an inefficient process with little flexibility. An apparatus is typically operated without any regard to potential issues. Using an apparatus without any regard to potential issues may result in user safety issues.

SUMMARY

The present invention provides a method comprising: receiving, by a computer processor of a computing system, apparatus data associated with an electro/mechanical apparatus; analyzing, by the computer processor, the apparatus data; determining, by the computer processor based on results of the analyzing the apparatus data, a type associated with an electro/mechanical apparatus; determining, by the computer processor, a current mode associated with said electro/mechanical apparatus; determining, by said computer processor, a current operational state of said electro/mechanical apparatus; generating, by said computer processor in response to said determining said current mode, said determining said current operational state, and said determining said type, a list of available safeguard devices for said electro/mechanical apparatus; presenting, by said computer processor to an individual, said list of available safeguard devices; receiving, by said computer processor from the individual, a selection for at least one safeguard device of the list of available safeguard devices; retrieving, by the computer processor from a detection device, first detection data associated with the at least one safeguard device with respect to the electro/mechanical apparatus; determining, by the computer processor based on the first detection data, if the at least one safeguard device is currently present; and executing, by the computer processor based on first results of the determining if the at least one safeguard device is currently present, a specified action with respect to operating the electro/mechanical apparatus.

The present invention provides computer program product, comprising a computer readable storage device storing a computer readable program code, the computer readable program code comprising an algorithm that when executed by a computer processor of a computer system implements a method, the method comprising: receiving, by the computer processor, apparatus data associated with an electro/mechanical apparatus; analyzing, by the computer processor, the apparatus data; determining, by the computer processor based on results of the analyzing the apparatus data, a type associated with an electro/mechanical apparatus; determining, by the computer processor, a current mode associated with the electro/mechanical apparatus; determining, by the computer processor, a current operational state of the electro/mechanical apparatus; generating, by the computer processor in response to the determining the current mode, the determining the current operational state, and the determining the type, a list of available safeguard devices for the electro/mechanical apparatus; presenting, by the computer processor to an individual, the list of available safeguard devices; receiving, by the computer processor from the individual, a selection for at least one safeguard device of the list of available safeguard devices; retrieving, by the computer processor from a detection device, first detection data associated with the at least one safeguard device with respect to the electro/mechanical apparatus; determining, by the computer processor based on the first detection data, if the at least one safeguard device is currently present; and executing, by the computer processor based on first results of the determining if the at least one safeguard device is currently present, a specified action with respect to operating the electro/mechanical apparatus.

The present invention provides a computer system comprising a computer processor coupled to a computer-readable memory unit, the memory unit comprising instructions that when executed by the computer processor implements a method comprising: receiving, by the computer processor, apparatus data associated with an electro/mechanical apparatus; analyzing, by the computer processor, the apparatus data; determining, by the computer processor based on results of the analyzing the apparatus data, a type associated with an electro/mechanical apparatus; determining, by the computer processor, a current mode associated with the electro/mechanical apparatus; determining, by the computer processor, a current operational state of the electro/mechanical apparatus; generating, by the computer processor in response to the determining the current mode, the determining the current operational state, and the determining the type, a list of available safeguard devices for the electro/mechanical apparatus; presenting, by the computer processor to an individual, the list of available safeguard devices; receiving, by the computer processor from the individual, a selection for at least one safeguard device of the list of available safeguard devices; retrieving, by the computer processor from a detection device, first detection data associated with the at least one safeguard device with respect to the electro/mechanical apparatus; determining, by the computer processor based on the first detection data, if the at least one safeguard device is currently present; and executing, by the computer processor based on first results of the determining if the at least one safeguard device is currently present, a specified action with respect to operating the electro/mechanical apparatus.

The present invention advantageously provides a simple method and associated system capable of determining a safe method for operating an apparatus.

DETAILED DESCRIPTION

Figure 1:
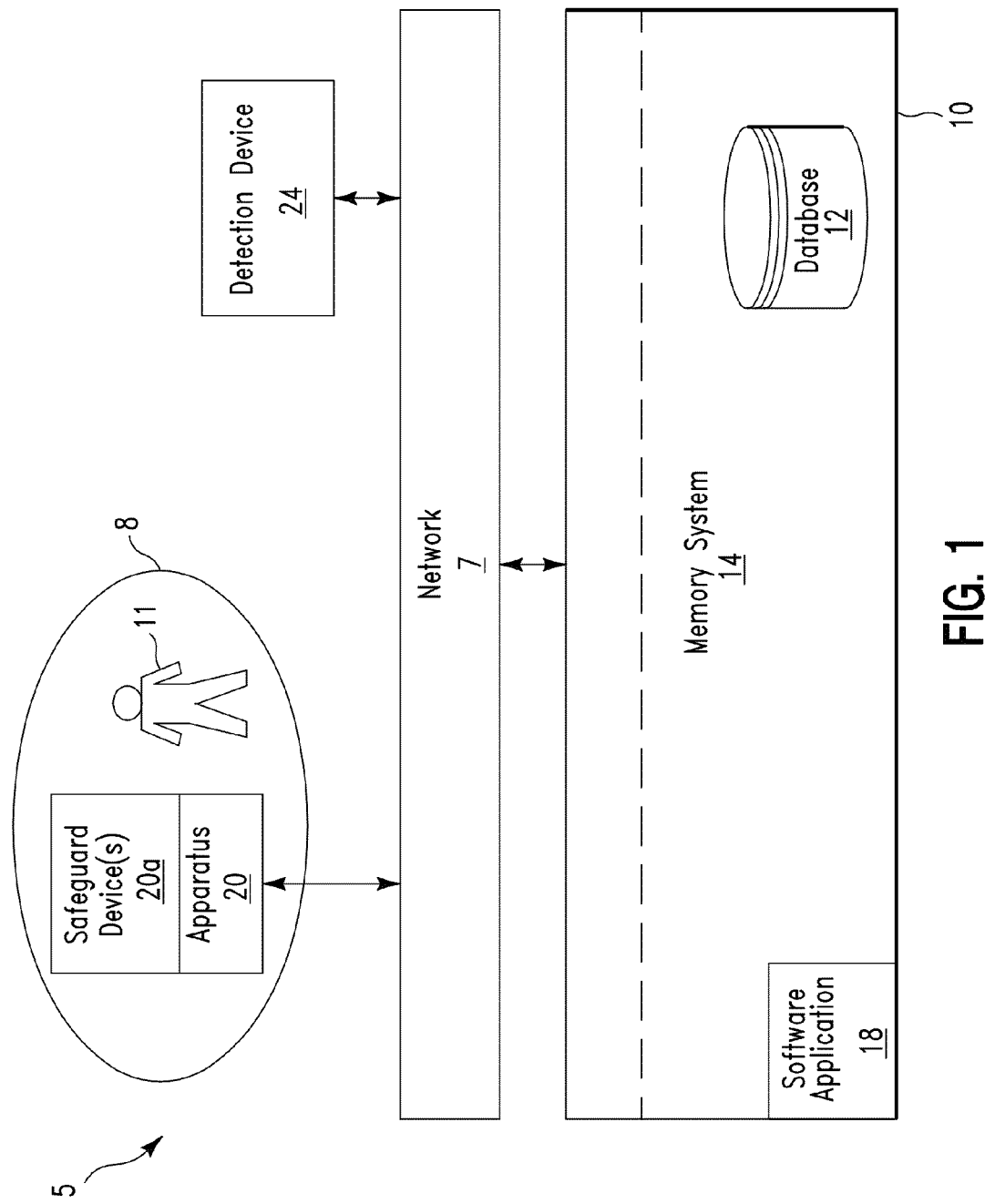
FIG. 1 illustrates a system for enabling or disabling an apparatus based on detection of a safeguard device(s), in accordance with embodiments of the present invention.

FIG. 1 illustrates a system 5 for enabling or disabling an (electro/mechanical) apparatus 20 based on detection of a safeguard device(s) 20a associated with apparatus 20, in accordance with embodiments of the present invention. A safeguard device is defined herein as a device designed to protect a user 11 of apparatus 20 from injury sustained from dangerous parts (e.g., a blade, an open flame, a drill bit, electrical voltage/current, etc) of apparatus 20. Apparatus 20 may comprise any electro/mechanical device requiring a safeguard device(s) 20a for protection of a user. For example, apparatus 20 may comprise, inter alia, a saw, a drill, welding equipment, laboratory equipment, chemical equipment, machine shop equipment, automotive repair equipment, etc. Safeguard device(s) 20a may include any type of safeguard (attached to apparatus 20) associated with protecting a user 11 from injury while operating apparatus 20. For example, safeguard device(s) 20a may include, inter alia, interlock guards using safety interlock switches, safety light screens/curtains, two hand control solutions, emergency stop devices/switches, a safety module and controllers, a plastic shield, etc.

System 5 provides a continuous real time system associated with enabling operation of apparatus 20 under the following conditions: safeguarding equipment (e.g., safeguard device(s) 20a) must be present, safeguarding equipment must be operational and used properly during machine (e.g., apparatus 20) operation, determining if an operator (e.g., user 11) is authorized to operate apparatus in a specified (e.g., maintenance) mode, etc. System 5 may detect that safeguard device(s) is present and operational by detecting and verifying a position of labels (on portions of safeguard device(s) 20a and apparatus 20) using an optical character recognition process. System 5 may sense an appropriate label within a unique zone (i.e., on safeguard device(s) 20a and/or apparatus 20). The unique zone may be determined by, inter alia, a triangulation process, a radar/optical process, etc. Alternatively, system 5 may detect and verify a position of safeguard device(s) 20a via object recognition software. Additionally, if safeguard device(s) is not present or operating correctly, a safety mechanism (e.g., for disrupting a power supply to apparatus 20, for disengaging a clutch, etc) may be engaged to disable operation. An external audio/visual warning system may additionally be activated to note a violation of a safeguarding policy.

System 5 of FIG. 1 comprises apparatus 20 (comprising safeguard device 20a) and detection device 24 connected through a network 7 to a computing system 10. Alternatively, apparatus 20 and detection device 24 may be directly connected to computing system 14 without network 7. Detection device 24 may comprise any type of detection device capable of detecting:

1. Detecting that safeguard device 20a is in a proper position and operating correctly.
2. Detecting a specific mode (e.g., operational or maintenance mode) or state associated with operation of apparatus 20.
3. Detecting that user 11 is located within a specified proximity 8 (or area) of apparatus 20.
4. Detecting a user 11 and/or bystander position with respect to apparatus 20.

Detection device 24 may comprise, inter alia, a camera or any other type of optical device, etc. Detection device 24 may be built into apparatus 20 or alternatively may be a part of a stand-alone device. Detection device 24 may comprise a plurality of image capture devices to monitor an area to determine multiple zones associated with apparatus 20 and/or safeguard device(s) 20. Detection device 24 device(s) may control a single or multiple safeguard devices 20a. A position of the detection device 24 device may determine a viewing angle and may be used to ensure that safeguard device 20a is in a proper (approved) working position to operate apparatus 20.

Network 7 may comprise any type of network including, inter alia, a local area network, (LAN), a wide area network (WAN), the Internet, etc. Computing system 10 may comprise any type of computing system(s) including, inter alia, a personal computer (PC), a server computer, a database computer, a controller, etc. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all retrieved detection and indication data and any log data.

In order to enable a safeguarding procedure, safeguard device 20a and portions of apparatus 20 are marked with wear resistant optical character recognition labels. Content on the optical character recognition labels and a location on apparatus 20 may be generic to a family of safeguarding equipment. Alternatively, the content may be unique for a specified safeguard device 20a or apparatus 20. Detection device 24 (e.g., a digital camera) continuously captures images during operation (or attempted operation) of apparatus. Software application 18 comprises algorithms for enabling the following safeguarding process:

Initially, an apparatus (e.g., apparatus 20) to be monitored is identified using input data and/or object recognition software. Applicable safeguarding equipment (e.g., safeguard device(s) 20a) and type (e.g., light curtain) applicable to the apparatus is determined and optical character recognition labels and associated zone/location(s) for the optical character recognition labels are determined. The character recognition label may be included as part of a manufacturing process (painted, imprinted, etched, permanent label, etc) on the apparatus. Alternatively, the apparatus may be retrofitted with a specified optical character recognition labels verified by a local safety team. A zone location comprises a pixel position/area within a digital image. The zone location is based on a specified position and resolution of a digital image capture device (e.g., detection device 24) and a distance and/or size of the optical character recognition labels. Additionally, a zone for a particular optical character recognition label may change based on a state of the apparatus. A state of the apparatus may be determined by a zone location of an optical character recognition label on the apparatus to be monitored. For example, a labeled chuck on a drill press may be 8 inches off of a platform in an idle state but 5 inches off the platform during a drilling (operational) state. In order to enable manufacturers (of apparatuses and safeguarding equipment) to determine specified zones and machine states, a test device comprising a capability for denoting specified states (e.g., idle, drilling, etc) may be used. Software application 18 determines if all optical character recognition labels for requested safeguarding equipment are present and in a proper location for each state of the apparatus. If no violations are determined, software application 18 allows for continued use of the apparatus. If violations are determined (e.g., an optical character recognition label not located in a proper zone for a specified state), software application 18 may perform the following functions: log an exception, disable operation of the apparatus (e.g., interrupt power, return to an idle state, etc), and/or transmit an audio/visual signal to denote exceptions. In order to perform the functions (i.e., with respect to the violations), software application 18 may enable programmatic actions to disable an operation of the apparatus/machine. The programmatic actions may: enable a safety switch thereby eliminating current, disabling a clutch, insert a blocking mechanism, etc. Programmatic actions may comprise a recovery action (i.e., to a reactive operation of the apparatus/ machine). Data identifying the recovery action may be stored for future reference. Programmatic actions may be state driven. For example, a first programmatic action (when attempting to use an apparatus) will not allow starting and will cause an indicator light to blink and a second programmatic action (i.e., if the apparatus/machine is already in use) may cause a safety block to drop in place (i.e., to disable the apparatus/machine). Additionally, audit records may be generated at various levels (e.g., a number of violations, users that violated policies, a time/date of violations, etc). The audit records may be used to validate adherence to governmental and corporate safety regulations. An optical image may be captured into memory when an individual violates safety policies (i.e., if a full facial recognition program is not enabled).

Figure 2:
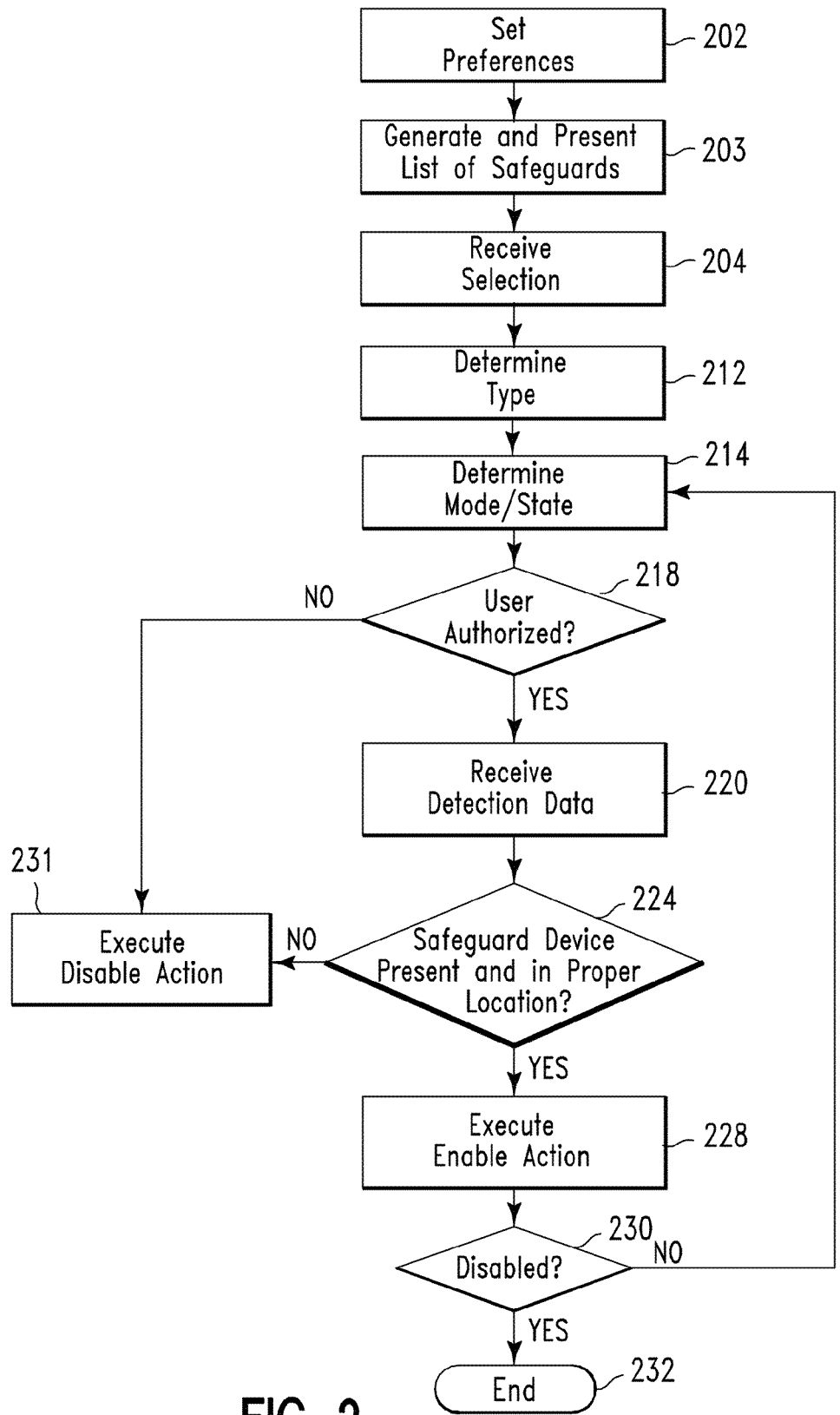
FIG. 2 illustrates a flowchart describing an algorithm used by the system of FIG. 1 for enabling or disabling an apparatus based on detection of a safeguard device(s), in accordance with embodiments of the present invention.

FIG. 2 illustrates a flowchart describing an algorithm used by system 5 of FIG. 1 for performing an action with respect to (electro/mechanical) apparatus 20 of FIG. 1, in accordance with embodiments of the present invention. In step 202, a computer processor of a computing system (e.g., computing system 10 of FIG. 1) receives and analyzes apparatus data (associated with the electro/mechanical apparatus) and enables safeguard preferences. The safeguard preferences may be enabled by selecting a specified safeguard from the following table 1 and/or selecting a specified action to be taken from the following table 2.

TABLE 1

| MODE/STATE | SAFEGUARD | ZONE |
| --- | --- | --- |
| Production/Idle | Plexi-glass Barrier | Middle Zone |
| Production/Drill | Plexi-glass Barrier | Lower Middle Zone |
| Maintenance | Safety Block | Pixel Based Zone D |

Table 1 illustrates various modes and states with associated safeguards and zones. For example, a production mode in an idle state (e.g., for a drill) requires a plexi-glass barrier safeguard located in a middle zone (with respect to the drill) while a production/drill mode requires a plexi-glass barrier safeguard located in a lower middle zone.

TABLE 2

| ACTION | ENABLED |
| --- | --- |
| Log | Yes |
| Alert Message | No |
| Disable | Yes |

Table 2 illustrates various enabled/disabled actions. For example, a log action is currently enabled (with respect to the drill) while an alert message is currently disabled. In step 203, the computer processor generates and presents (to the user) a list of safeguard devices required for the electro/mechanical apparatus. In step 204, the computer processor receives a selection for at least one safeguard device of the list.

In step 212, the computer processor analyzes the apparatus data and determines (based on results of the analyses) a type associated with the electro/mechanical apparatus. The type is used to generate the following table 3.

TABLE 3

| MODE | STATE | ZONE |
| --- | --- | --- |
| Production | Idle | Optical Character label in Upper Middle Zone |

TABLE 3-continued

| MODE | STATE | ZONE |
| --- | --- | --- |
| Production | Drilling | Optical Character label in Middle Zone |
| Maintenance | Maintenance | Optical Character label in Middle Zone and Operator Key in Maintenance Position |

Table 3 illustrates: applicable modes/states determined by a manufacturer of electro/mechanical apparatus; a zone determined by a camera angle; and a type of machine recognition (e.g., optical character recognition, object recognition, etc). In step 214, the computer processor determines a current mode (e.g., maintenance mode, production mode, etc) and operational state associated with the electro/mechanical apparatus. The current mode and operational state may be determined by: detected hardwiring in the electro/mechanical apparatus and/or analysis of a video image of the electro/mechanical apparatus. Additionally, a maintenance clock may be initialized if the electro/mechanical apparatus was recently enabled in a maintenance mode. The maintenance clock may be enabled to ensure that the operator does not continuously run the electro/mechanical apparatus in a maintenance mode verses a production mode. In step 218, the computer processor determines (e.g., by analyzing a video image of the user) if the user is authorized to use the electro/mechanical apparatus in the current mode and operational state. If in step 218, the computer processor determines that the user is not authorized to use the electro/mechanical apparatus then in step 231, an action disabling the electro/mechanical apparatus is executed. Alternatively, a warning indicator may be enabled. If in step 218, the computer processor determines that the user is authorized to use the electro/mechanical apparatus then in step 220, the computer processor receives (from a detection device such as a camera) detection data associated with the at least one safeguard device with respect to the electro/mechanical apparatus. In step 224, the computer processor determines (based on analyzing the detection data) if the at least one safeguard device is currently present and is in a proper location (or operating properly). If in step 224, the computer processor determines that the at least one safeguard device is not currently present and/or is not in a proper location (or operating properly) then in step 231, an action disabling the electro/mechanical apparatus is executed. Alternatively, a warning indicator may be enabled. If in step 224, the computer processor determines that the at least one safeguard device is currently present and/or is in a proper location (or operating properly) then in step 228, an action enabling the electro/mechanical apparatus is executed. In step 230, the computer processor determines if the electro/mechanical apparatus has been disabled (e.g., powered down). If in step 230, the computer processor determines that the electro/mechanical apparatus has been disabled then the process is terminated in step 232. If in step 230, the computer processor determines that the electro/mechanical apparatus has not been disabled then step 214 is repeated.

Figure 3:
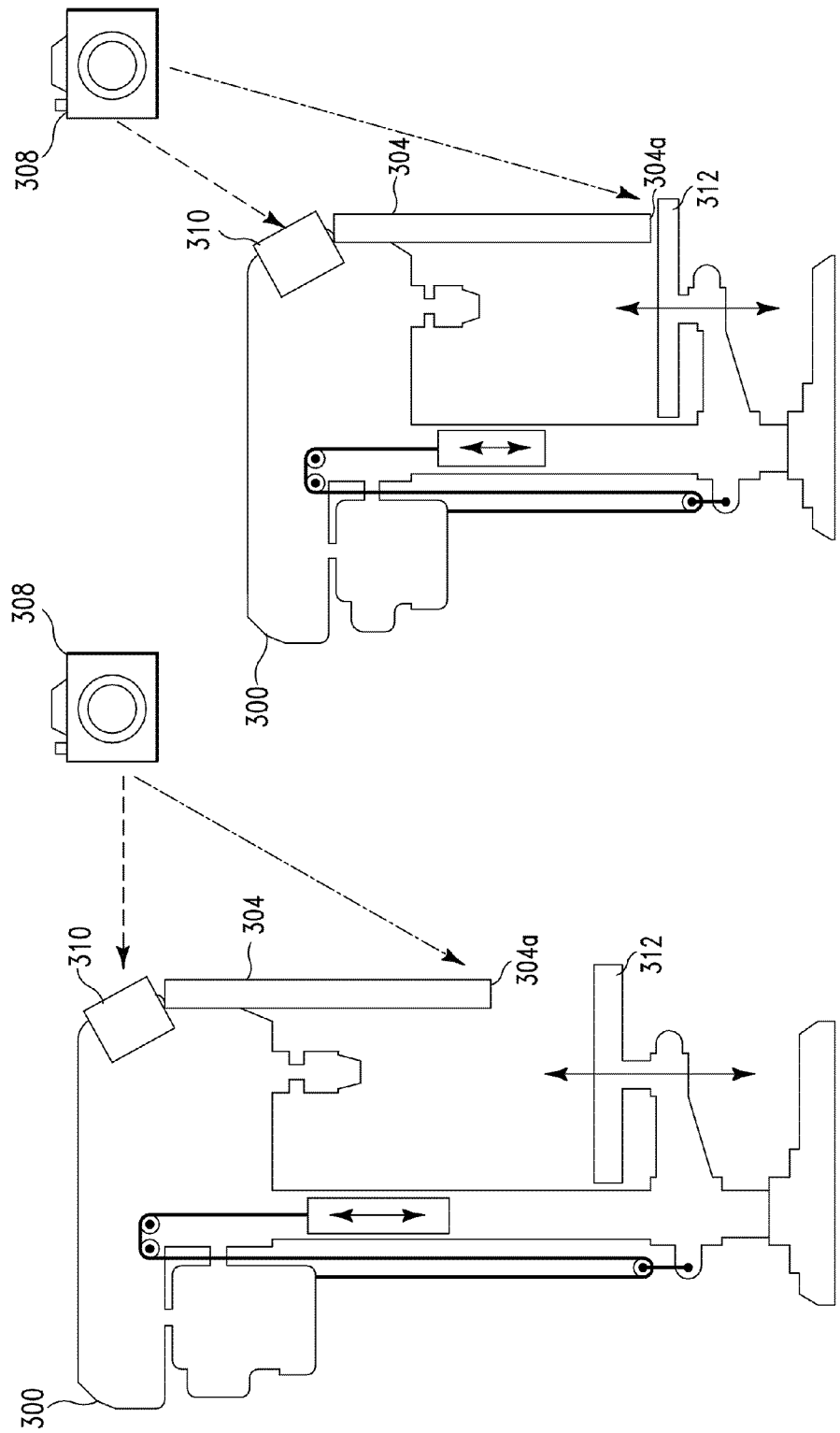
FIGS. 3A and 3B illustrate an implementation example for enabling or disabling a drill press based on detection of a safeguard device, in accordance with embodiments of the present invention.

FIGS. 3A and 3B illustrate an implementation example for enabling or disabling a drill press 300 based on detection of a safeguard device 304, in accordance with embodiments of the present invention.

FIG. 3A illustrates drill press 300 in an idle state/load position comprising safeguard device 304 (i.e., a barrier) in an open position. The aforementioned information may be determined by use of a detection device 308 (a camera) detecting a reference marker 310 with respect to a distance that an end 304a of the safeguard device 304 is from a platform 312.

FIG. 3B illustrates drill press 300 in a drilling state/load position comprising safeguard device 304 (i.e., a barrier) in a closed position. The aforementioned information may be determined by use of detection device 308 (a camera) detecting reference marker 310 with respect to a distance that an end 304a of the safeguard device 304 is from a platform 312.

Figure 4:
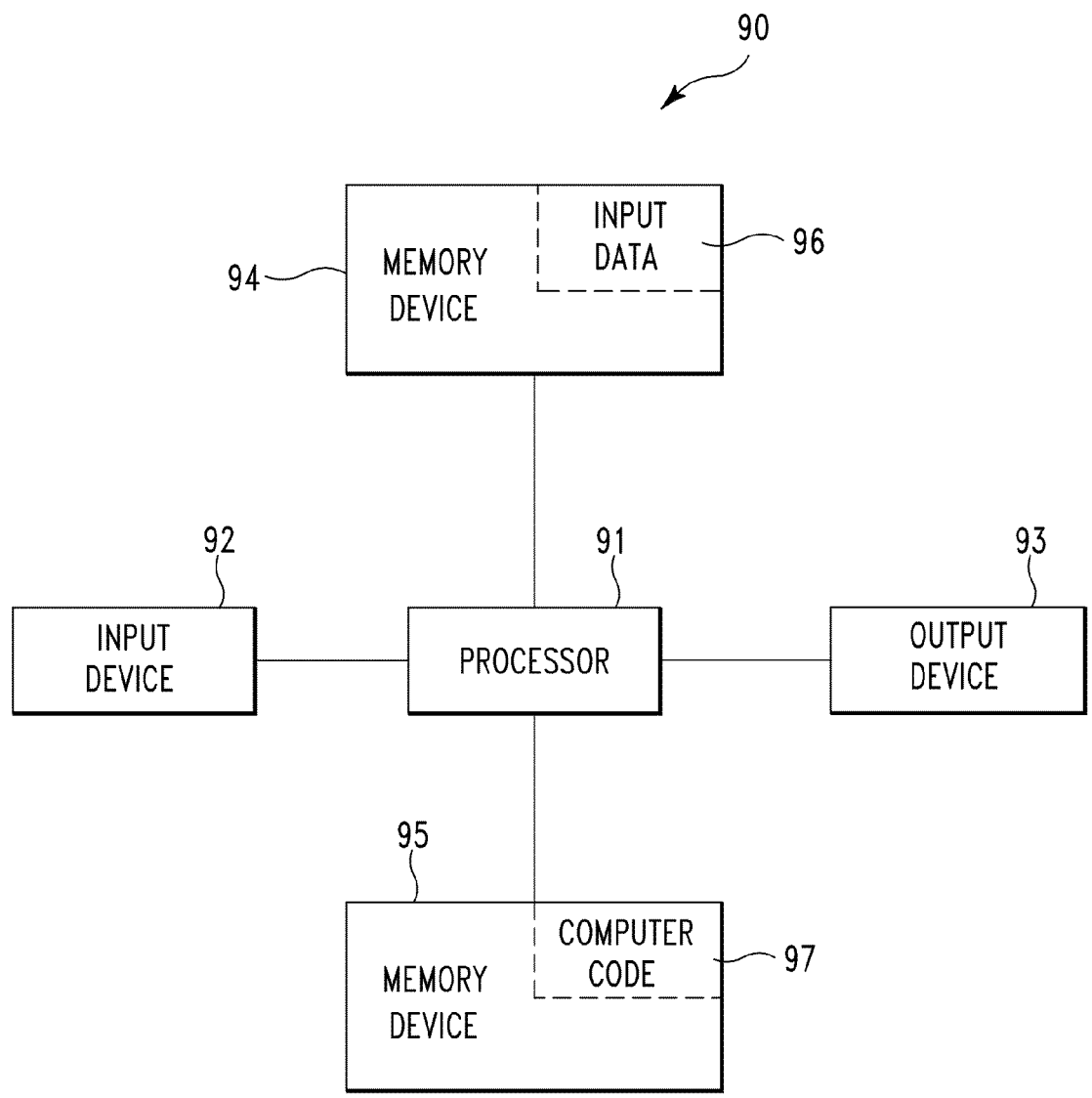
FIG. 4 illustrates a computer apparatus used for enabling or disabling an apparatus based on detection of a safeguard device(s), in accordance with embodiments of the present invention.

FIG. 4 illustrates a computer apparatus 90 (e.g., computing system 10 of FIG. 1) used for enabling or disabling an apparatus based on detection of a safeguard device(s) associated with the apparatus, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for enabling or disabling an apparatus based on detection of a safeguard device(s) associated with the apparatus. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to enable or disable an apparatus based on detection of a safeguard device(s) associated with the apparatus. Thus the present invention discloses a process for deploying, creating, integrating, hosting, and/or maintaining computing infrastructure, comprising integrating computer-readable code into the computer system 90, wherein the code in combination with the computer system 90 is capable of performing a method maintaining. In another embodiment, the invention provides a method that performs the process steps of the invention on a subscription, advertising, and/or fee basis. That is, a service provider, such as a Solution Integrator, could offer to enable or disable an apparatus based on detection of a safeguard device(s) associated with the apparatus. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
   receiving, by a computer processor of a computing system, apparatus data associated with an electro/mechanical apparatus;
   analyzing, by said computer processor, said apparatus data;
   determining, by said computer processor based on results of said analyzing said apparatus data, a type associated with an electro/mechanical apparatus;
   determining, by said computer processor, a current mode associated with said electro/mechanical apparatus;
   determining, by said computer processor, a current operational state of said electro/mechanical apparatus;
   generating, by said computer processor in response to said determining said current mode, said determining said current operational state, and said determining said type, a list of available safeguard devices for said electro/mechanical apparatus;
   presenting, by said computer processor to an individual, said list of available safeguard devices;
   receiving, by said computer processor from said individual, a selection for at least one safeguard device of said list of available safeguard devices;
   retrieving, by said computer processor from a detection device, first detection data associated with said at least one safeguard device with respect to said electro/mechanical apparatus;
   determining, by said computer processor based on said first detection data, if said at least one safeguard device is currently present; and
   executing, by said computer processor based on first results of said determining if said at least one safeguard device is currently present, a specified action with respect to operating said electro/mechanical apparatus.

2. The method of claim 1, further comprising:
   determining, by said computer processor based on said analyzing said apparatus data, a proper location for said at least one safeguard device; and
   determining, by said computer processor based on said first detection data, if said at least one safeguard device is in a proper location, wherein said executing is further based on results of said determining if said at least one safeguard device is in a proper location.

3. The method of claim 1, further comprising:
   determining, by said computer processor based on said first detection data, if said at least one safeguard device is operational, wherein said executing is further based on results of said determining if said at least one safeguard device is operational.

4. The method of claim 1, further comprising:
   receiving, by said computer processor, user data associated with a user of said electro/mechanical apparatus; and
   determining, by said computer processor based on analyzing said user data, if said user is authorized to operate said electro/mechanical apparatus in said current mode, wherein said executing is further based on results of said determining if said user is authorized to operate said electro/mechanical apparatus in said current mode.

5. The method of claim 1, further comprising:
determining, by said computer processor based on said first detection data, if said at least one safeguard device is being properly operated, wherein said executing is further based on results of said determining if said at least one safeguard device is being properly operated.

6. The method of claim 1, wherein said current mode comprises a usage mode, wherein said first results indicate that said at least one safeguard device is not currently present, and wherein said executing specified action comprises:
performing, by said computer processor, a specified operation associated with said electro/mechanical apparatus, wherein said specified operation comprises an operation selected from the group consisting of disabling said electro/mechanical apparatus from operation, enabling an alarm, logging an error, and transmitting a message to an authorized user.

7. The method of claim 6, further comprising:
before said performing, enabling by said computer processor, said electro/mechanical apparatus to complete a specified operation cycle.

8. The method of claim 1, wherein said current mode comprises a maintenance mode, and wherein said method further comprises:
enabling, by said computer processor, said electro/mechanical apparatus to operate for a specified time period, wherein said first results indicate that a correct safeguard device associated with said maintenance mode is not currently present or operating correctly, and wherein said executing specified action comprises:
disabling, by said computer processor, said electro/mechanical apparatus from operation.

9. The method of claim 1, further comprising:
receiving, by said computer processor, second detection data associated with a current zone location for an operational device of said electro/mechanical apparatus; and
analyzing, by said computer processor, said second detection data, wherein said executing is further based on results of said analyzing, by said computer processor, said second detection data.

10. The method of claim 1, wherein said detection device comprises a video retrieval device, and wherein said determining if said at least one safeguard device is currently present comprises:
enabling, by said computer processor, a character recognition process associated with said electro/mechanical apparatus and said safeguard device; and
validating, by said computer processor in response to results generated during said character recognition process, that said safeguard device comprises a unique marking.

11. The method of claim 1, wherein said unique marking comprises a unique alpha/numeric code.

12. The method of claim 1, wherein said detection device comprises a video retrieval device, and wherein said method further comprises:
performing, by said computer processor, a facial recognition process of said first individual; and
determining, by said computer processor based results of said facial recognition process, if said user is authorized to operate said electro/mechanical apparatus, wherein said executing is further based on results of said determining if said user is authorized to operate said electro/mechanical apparatus.

13. The method of claim 1, wherein said current mode comprises a usage mode, wherein said first results indicate that said at least one safeguard device is not operating properly, and wherein said executing specified action comprises:
performing, by said computer processor, a specified operation associated with said electro/mechanical apparatus, wherein said specified operation comprises an operation selected from the group consisting of disabling said electro/mechanical apparatus from operation, enabling an alarm, logging an error, and transmitting a message to an authorized user.

14. The method of claim 1, further comprising:
providing at least one support service for at least one of creating, integrating, hosting, maintaining, and deploying computer-readable code in said computing system, wherein the code in combination with the computing system is capable of performing the method of claim 1.

15. A computer program product, comprising a non-transitory computer readable storage device storing a computer readable program code, said computer readable program code comprising an algorithm that when executed by a computer processor of a computer system implements a method, said method comprising:
receiving, by said computer processor, apparatus data associated with an electro/mechanical apparatus;
analyzing, by said computer processor, said apparatus data;
determining, by said computer processor based on results of said analyzing said apparatus data, a type associated with an electro/mechanical apparatus;
determining, by said computer processor, a current mode associated with said electro/mechanical apparatus;
determining, by said computer processor, a current operational state of said electro/mechanical apparatus;
generating, by said computer processor in response to said determining said current mode, said determining said current operational state, and said determining said type, a list of available safeguard devices for said electro/mechanical apparatus;
presenting, by said computer processor to an individual, said list of available safeguard devices;
receiving, by said computer processor from said individual, a selection for at least one safeguard device of said list of available safeguard devices;
retrieving, by said computer processor from a detection device, first detection data associated with said at least one safeguard device with respect to said electro/mechanical apparatus;
determining, by said computer processor based on said first detection data, if said at least one safeguard device is currently present; and
executing, by said computer processor based on first results of said determining if said at least one safeguard device is currently present, a specified action with respect to operating said electro/mechanical apparatus.

16. The computer program product of claim 15, wherein said method further comprises:
determining, by said computer processor based on said analyzing said apparatus data, a proper location for said at least one safeguard device; and
determining, by said computer processor based on said first detection data, if said at least one safeguard device is in a proper location, wherein said executing is further based on results of said determining if said at least one safeguard device is in a proper location.

17. The computer program product of claim 15, wherein said method further comprises:

determining, by said computer processor based on said first detection data, if said at least one safeguard device is operational, wherein said executing is further based on results of said determining if said at least one safeguard device is operational.

18. The computer program product of claim 15, wherein said method further comprises:
receiving, by said computer processor, user data associated with a user of said electro/mechanical apparatus; and
determining, by said computer processor based on analyzing said user data, if said user is authorized to operate said electro/mechanical apparatus in said current mode, wherein said executing is further based on results of said determining if said user is authorized to operate said electro/mechanical apparatus in said current mode.

19. The computer program product of claim 15, wherein said method further comprises:
determining, by said computer processor based on said first detection data, if said at least one safeguard device is being properly operated, wherein said executing is further based on results of said determining if said at least one safeguard device is being properly operated.

20. A computer system comprising a computer processor coupled to a computer-readable memory unit, said memory unit comprising instructions that when executed by the computer processor implements a method comprising:
receiving, by said computer processor, apparatus data associated with an electro/mechanical apparatus;
analyzing, by said computer processor, said apparatus data;
determining, by said computer processor based on results of said analyzing said apparatus data, a type associated with an electro/mechanical apparatus;
determining, by said computer processor, a current mode associated with said electro/mechanical apparatus;
determining, by said computer processor, a current operational state of said electro/mechanical apparatus;
generating, by said computer processor in response to said determining said current mode, said determining said current operational state, and said determining said type, a list of available safeguard devices for said electro/mechanical apparatus;
presenting, by said computer processor to an individual, said list of available safeguard devices;
receiving, by said computer processor from said individual, a selection for at least one safeguard device of said list of available safeguard devices;
retrieving, by said computer processor from a detection device, first detection data associated with said at least one safeguard device with respect to said electro/mechanical apparatus;
determining, by said computer processor based on said first detection data, if said at least one safeguard device is currently present; and
executing, by said computer processor based on first results of said determining if said at least one safeguard device is currently present, a specified action with respect to operating said electro/mechanical apparatus.

\* \* \* \* \*